(No Model.)

W. MOLLER.
PULVERIZER.

No. 306,275. Patented Oct. 7, 1884.

WITNESSES:

INVENTOR
William Moller.
BY
Van Santvoord & Hauff
his ATTORNEYS

N. PETERS, Photo-Lithographer, Washington, D. C.

UNITED STATES PATENT OFFICE.

WILLIAM MOLLER, OF YONKERS, NEW YORK.

PULVERIZER.

SPECIFICATION forming part of Letters Patent No. 306,275, dated October 7, 1884.

Application filed January 31, 1884. (No model.)

*To all whom it may concern:*

Be it known that I, WILLIAM MOLLER, a citizen of the United States, residing at Yonkers, in the county of Westchester and State of New York, have invented new and useful Improvements in Pulverizers, of which the following is a specification.

This invention relates to a machine for pulverizing ore and other materials. The peculiar and novel construction of my pulverizer is pointed out in the following specification and claims, and illustrated in the accompanying drawings, in which—

Figure 1:
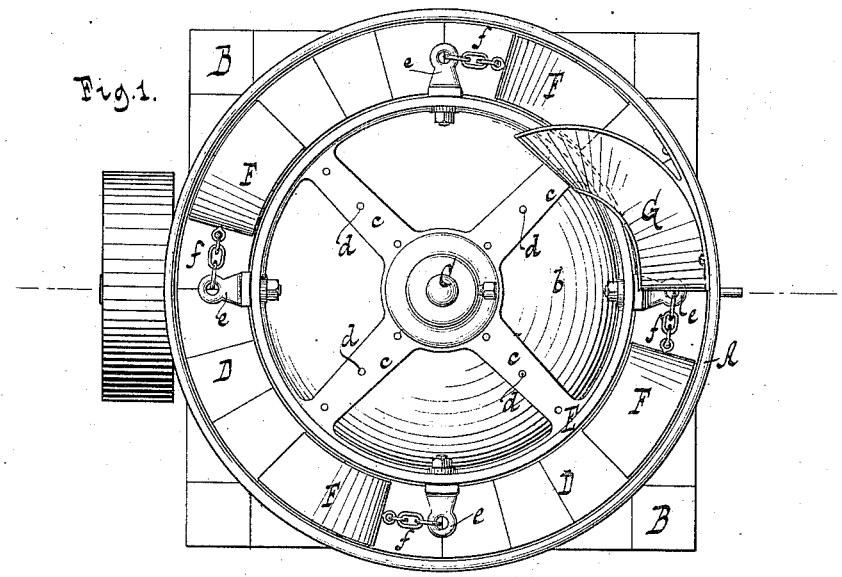
Figure 2:
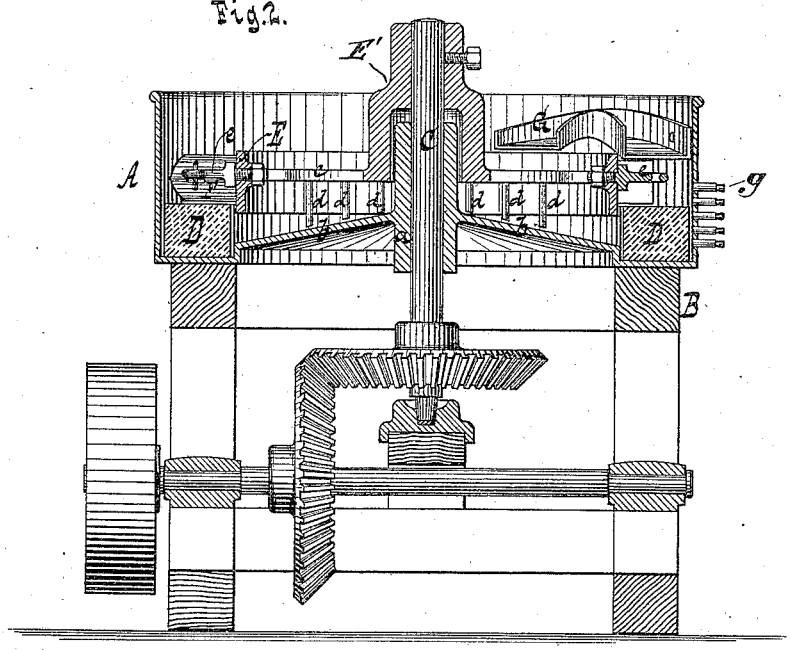

Figure 1 represents a plan or top view. Fig. 2 is a vertical central section.

Similar letters indicate corresponding parts.

In the drawings, the letter A designates a pan, which is supported by the frame B. From the center of the bottom of this pan extends a hub, $a$, through which passes the shaft C. The inner portion of the bottom of the pan forms a cone, $b$, and outside of this cone is situated the stationary grinder D, which is by preference made in sections situated close together and firmly secured in the pan A.

On the shaft C is firmly secured the hub E', from which extend a series of arms, $c$, which support the ring E, and in these arms are firmly secured the agitators $d$, which extend down close to the surface of the cone $b$. On said ring are firmly secured a series of arms, $e$, which extend outward, and to which are secured the movable grinders F. In the example represented by the drawings I have shown four such grinders; but this number may be increased or diminished as circumstances may make desirable.

For the purpose of attaching the movable grinders to the arms $e$, I use chains $f$; or, in place of chains, wire ropes or equivalent means may be used, whereby the grinders are free to move up or down, so that they act upon the material to be pulverized simply by their own weight, and can accommodate themselves to the surface of the stationary grinder, which is liable to wear off pretty rapidly.

To the inner surface of the outside wall of the pan A is firmly secured a chute, G, which is situated over the arms $e$, and extends inward over the ring E, as shown in the drawings.

The grinders are made of burr-stone, iron, or any other suitable material, and the rim of the ring E forms a moving partition between the inner space of the pan and the grinders.

The material to be pulverized is dumped upon the cone $b$, and when a revolving motion is imparted to the ring E the material is gradually worked down by the agitators $d$ over the inclined surface of the cone, and caused to rise on the inner surface of the stationary grinder D and between the same and the ring E, so as to pass between the grinders D F. By the action of these grinders the material is gradually reduced, and as the same accumulates in the outer part of the pan A it returns through the chute G to the space in the interior of the ring E, whence it is again forced toward the grinders, so that in a comparatively short time said material becomes reduced to the desired degree of fineness; and since the movable grinders are connected to the arms $e$ by chains or equivalent flexible connections, they act on the material with a uniform pressure due to their inherent gravity, and the operation of pulverizing ore or other materials can be effected with comparatively little power and with great economy in labor. The pulverized material is removed through openings closed by plugs $g$.

What I claim as new, and desire to secure by Letters Patent, is—

1. The combination, substantially as hereinbefore described, of the pan A, having the cone forming the inner portion of its bottom, the stationary grinder secured in the pan outside of said cone, the shaft C, the hub mounted on said shaft and provided with the arms $c$, extending out therefrom, the ring secured to said arms, the agitators extending down from said arms, the arms $e$, extending outward from said ring, the movable grinders, and the flexible connections for joining said grinders to the arms $e$.

2. The combination, substantially as hereinbefore described, of the pan A, having the cone forming the inner portion of its bottom, the stationary grinder secured in the pan outside of said cone, the shaft C, the hub provided with the arms, having at their outer ends the ring E, and secured to said shaft, the agitators secured to said arms, the arms $e$, extending outward from said ring, the movable grinders, the flexible connections between the same and arms e, and the chute.

3. The combination, substantially as hereinbefore described, of the pan A, the hub E', provided with outwardly-extending arms c, having the ring E at their outer ends, the agitators secured to and extending downwardly from said arms inside of said ring, and the grinders outside of the ring and secured thereto, substantially as described.

In testimony whereof I have hereunto set my hand and seal in the presence of two subscribing witnesses.

WILLIAM MOLLER. [L. S.]

Witnesses:
W. HAUFF,
E. F. KASTENHUBER.